Patented May 31, 1938

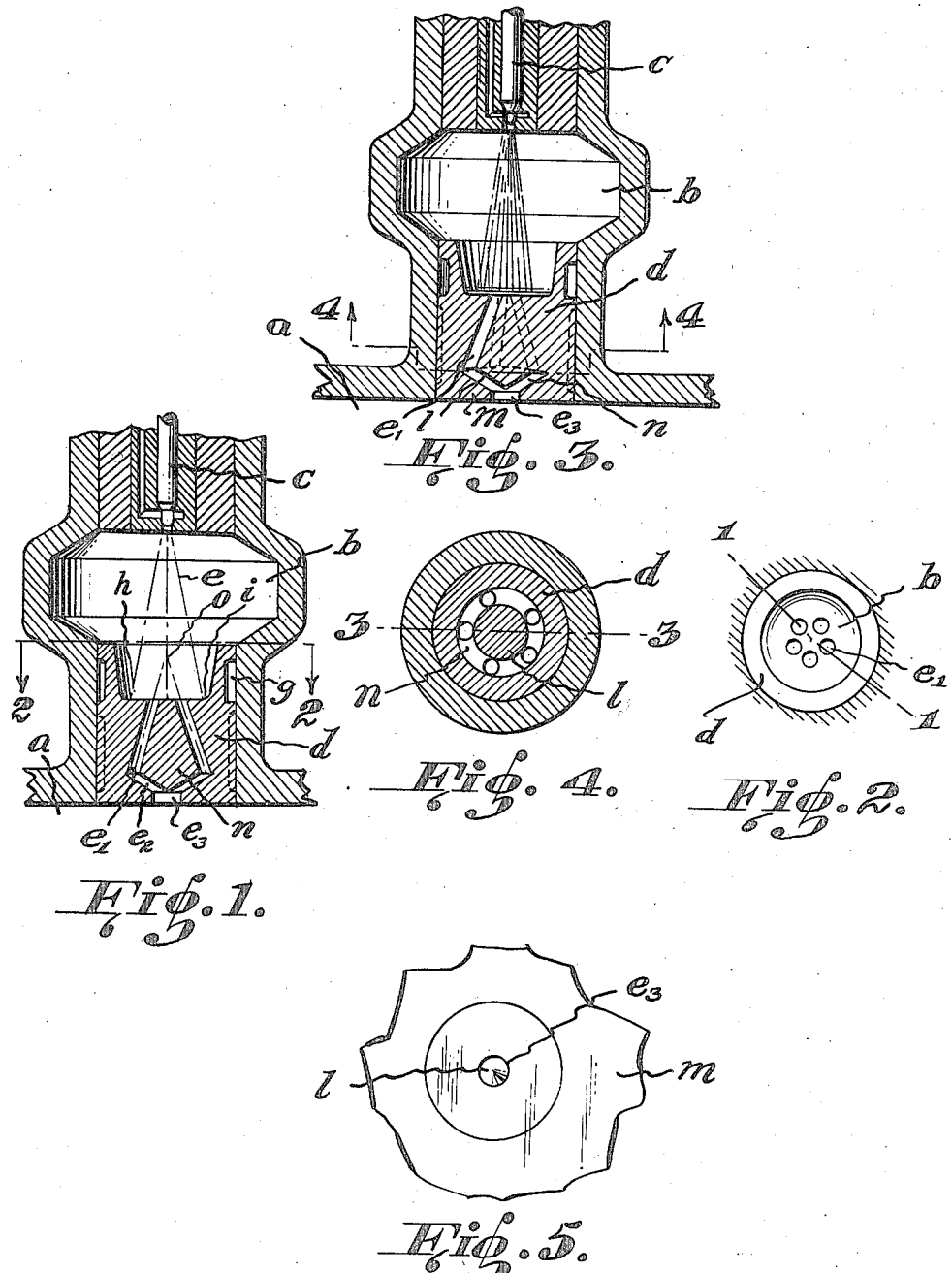

2,118,895

UNITED STATES PATENT OFFICE 2,118,895

PRECOMBUSTION CHAMBER FOR DIESEL ENGINES

Fritz Nallinger, Stuttgart, Germany, assignor to Daimler Benz Aktiengesellschaft, Stuttgart-Unterturkheim, Germany Application February 6, 1935, Serial No. 5,290
In Germany February 7, 1934

4 Claims. (Cl. 123—33)

The present invention relates to a precombustion chamber especially for high speed diesel engines the chamber being provided with a core piece acting as an atomizer. From the injection nozzle the fuel is squirted against the core piece which is surrounded by a plurality of passages forwarding the fuel to the main combustion chamber from the ignition chamber. These passages are curved or form a knee or elbow or are undercut. The invention consists in that, that one branch of a passage preferably converges in the direction of the fuel delivering nozzle, the other branch converging towards the outlet conducting to the main combustion chamber.

As compared with the well known precombustion chambers the invention provides the advantage that the fuel jet does not cool at the cold walls of the precombustion chamber thereby providing an easier starting especially at cold times. Furthermore a softer running of the engine can be reached by the improved precombustion chamber.

In order to explain more clearly the invention, reference may now be had to the accompanying drawing in which Fig. 1 shows diagrammatically a precombustion chamber according to the invention in vertical section on line 1—1 of Fig. 2 and Fig. 2 a section along 2—2 of Fig. 1.

Fig. 3 shows diagrammatically a vertical section of a modification,

Fig. 4 is a section on line 4—4 of Fig. 3, and

Fig. 5 is a bottom plan view of the constructional form shown in Fig. 3.

Referring to Figs. 1 and 2, $a$ is the main combustion chamber, $b$ the precombustion chamber serving as ignition chamber and provided e. g. in the cooling jacket, and $c$ is the fuel injection nozzle by means of which the fuel is injected in the form of a conical jet $e$ into the precombustion chamber. Between the precombustion chamber and the main combustion chamber is arranged an insertion piece $d$, the upper portion of which is provided with an annular cavity $g$ forming a heating insulating air space. The upper part of the insertion piece is in the form of a cup $h$, the bottom $i$ of which forms a plane atomizing surface at right angles to the direction of the jet of fuel leaving the nozzle $c$ against which surface the fuel is injected.

The insertion piece $d$ is provided with throttling openings for establishing communication between the precombustion chamber and the main combustion chamber. These throttling openings have a bend therein, so as to prevent a straight line flow of fuel from the nozzle $c$ to the main combustion chamber $a$, and comprise branches $e_1$ which lead into the precombustion chamber and branches $e_2$ which lead into a common central throttle opening $e_3$ in open communication with the main combustion chamber. The throttling openings are arranged around a core piece $n$ which extends from the atomizing surface $i$ to the central throttle opening $e_3$, the branches $e_1$ converging towards the axis of the fuel jet and the branches $e_2$ towards the main combustion chamber, towards a point situated on the axis of the core piece immediately behind the throttle opening $e_3$. The axes of the parts $e_1$ of the throttling conduits are situated within the fuel jet cone and converge towards the point $o$ therein, so that the air flowing through the throttling openings into the precombustion chamber can penetrate in the form of a wedge into the core of the fuel jet cone and produce intensive heating atomization, and mixing of the fuel with the air.

The insertion piece $d$ forms a heat storing part of the combustion chamber of considerable wall thickness, so that the air flowing into the precombustion chamber from the main combustion chamber can take up heat therefrom and cause the fuel to be brought more rapidly to the ignition temperature.

In the drawing there are shown 5 passages, but one can also provide more or less of these passages of round, square or otherwise formed section, in lieu of the separated passages there can be provided also uninterrupted holes, for example cones, the core piece being in junction with the outer part by connecting arms. Preferably the openings $e_1$ are of circular section.

In the modification shown in Figs. 3, 4 and 5 the branches $e_2$ are replaced by a conical annular passage $n$ in open communication with the bores $e_1$ and formed between the end $l$ of the core piece and the wall $m$ which is spaced therefrom and is provided with a throttle opening $e_3$ in open communication with the main combustion chamber $a$. The conical annular passage converges towards a point situated on the axis of the core piece immediately behind the throttle opening $e_3$ and forms with the bores $e_1$ a throttling connection having an angular bend therein between the ignition chamber and the main combustion chamber $a$.

What I claim is:

1. In an internal combustion engine receiving fuel by injection, in combination, a main combustion chamber, an ignition chamber having a throttle opening therein in open communication with the main combustion chamber, a fuel injection nozzle arranged to inject a jet of fuel into the ignition chamber, said ignition chamber having a substantially plane atomizing surface therein arranged at right angles to the direction of the jet of fuel leaving the nozzle, a core piece extending from said atomizing surface towards the throttle opening with a plurality of throttling conduits arranged around the core piece and extending from said atomizing surface to the throttle opening for establishing communication between the interior of the ignition chamber and the throttle opening, said throttling conduits having an angular bend therein so that the ends of the conduits extending to the atomizing surface converge towards the axis of the fuel jet and the ends of the conduits extending to the throttle opening converge towards a point situated on the axis of the core piece immediately behind the throttle opening.

2. In an internal combustion engine receiving fuel by injection, in combination, a main combustion chamber, an ignition chamber, a fuel injection nozzle arranged to inject a jet of fuel into the ignition chamber and an insertion piece in the ignition chamber having an atomizing surface arranged substantially at right angles to the direction of the jet of fuel leaving the nozzle and having a core piece extending from said atomizing surface with a plurality of throttling bores arranged around the core piece and converging towards the axis of the fuel jet, said insertion piece having a wall spaced from the end of the core piece and having a conical annular passage in open communication with the throttling bores between said wall and the end of the core piece and said wall having a throttle opening in open communication with the main combustion chamber, said conical annular passage converging towards a point situated on the axis of the core piece immediately behind said throttle opening, so as to form with the throttling bores a throttling connection having an angular bend therein for establishing communication between the ignition chamber and the main combustion chamber.

3. In an internal combustion engine receiving fuel by injection, in combination, a main combustion chamber, an ignition chamber, a heat storing part of considerable wall thickness between the ignition chamber and the main combustion chamber and a fuel injection nozzle arranged to inject fuel in a cone through the ignition chamber against the heat storing part, said heat storing part having a plurality of throttling openings therein, the length of which is a multiple of their diameter, for establishing communication between the ignition chamber and the main combustion chamber, said throttling openings being grouped around the axis of the fuel jet cone with the axes of the parts thereof which deliver into the ignition chamber situated within the fuel jet cone and converging towards a point therein, so that the air flowing through the throttling openings into the ignition chamber can penetrate in the form of a wedge into the core of the fuel jet cone.

4. In an internal combustion engine receiving fuel by injection, the combination as set forth in claim 3 and in which the throttling openings are bent inside the heat storing part so that a straight line transfer of fuel through the throttling openings is prevented.

FRITZ NALLINGER.